(12) United States Patent
Ward

(10) Patent No.: US 10,922,060 B1
(45) Date of Patent: Feb. 16, 2021

(54) APPLICATION SOURCE CODE REUSE APPARATUSES, METHODS AND SYSTEMS

(71) Applicant: FMR LLC, Boston, MA (US)

(72) Inventor: John Ward, Worcester, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/584,816

(22) Filed: Sep. 26, 2019

(51) Int. Cl.
*G06F 8/41* (2018.01)
*G06F 16/901* (2019.01)
*G06F 8/36* (2018.01)

(52) U.S. Cl.
CPC .................. *G06F 8/41* (2013.01); *G06F 8/36* (2013.01); *G06F 16/901* (2019.01)

(58) Field of Classification Search
None
See application file for complete search history.

(56) References Cited

U.S. PATENT DOCUMENTS

| | | | | |
|---|---|---|---|---|
| 6,502,102 | B1 * | 12/2002 | Haswell | G06F 11/3664 |
| 9,158,658 | B2 * | 10/2015 | Bigwood | G06F 11/3624 |
| 2009/0037884 | A1 * | 2/2009 | Benameur | G06F 11/3608 |
| | | | | 717/126 |
| 2011/0113019 | A1 * | 5/2011 | Leff | G06F 16/252 |
| | | | | 707/695 |
| 2015/0025925 | A1 * | 1/2015 | Moore | G06Q 10/063 |
| | | | | 705/7.11 |
| 2015/0143348 | A1 * | 5/2015 | You | G06F 8/37 |
| | | | | 717/146 |
| 2017/0286067 | A1 * | 10/2017 | Eberlein | G06F 8/30 |

OTHER PUBLICATIONS

Gharehyazie, "Some From Here, Some From There: Cross-Project Code Reuse in GitHub", 2017, IEEE/ACM 14th International Conference (Year: 2017).*

* cited by examiner

*Primary Examiner* — Hossain M Morshed
(74) *Attorney, Agent, or Firm* — Hanchukkheit LLP; Walter G. Hanchuk

(57) ABSTRACT

The Application Source Code Reuse Apparatuses, Methods and Systems ("ACR") transforms compilation request inputs via ACR components into compilation response outputs. A compilation request datastructure that specifies an application identifier is obtained. A first source code branch associated with the application identifier is pulled from a source code repository. A second source code branch associated with the application identifier is rebased using the first source code branch. A first transformation file in the second source code branch is selected. The first transformation file is written in a first programming language and includes a first set of annotations that specify how to modify the first transformation file into a compilable file in the first programming language. The first transformation file is transformed, in accordance with the first set of annotations, into a compilable file in the first programming language. A content package is generated using the transformed first transformation file.

18 Claims, 9 Drawing Sheets

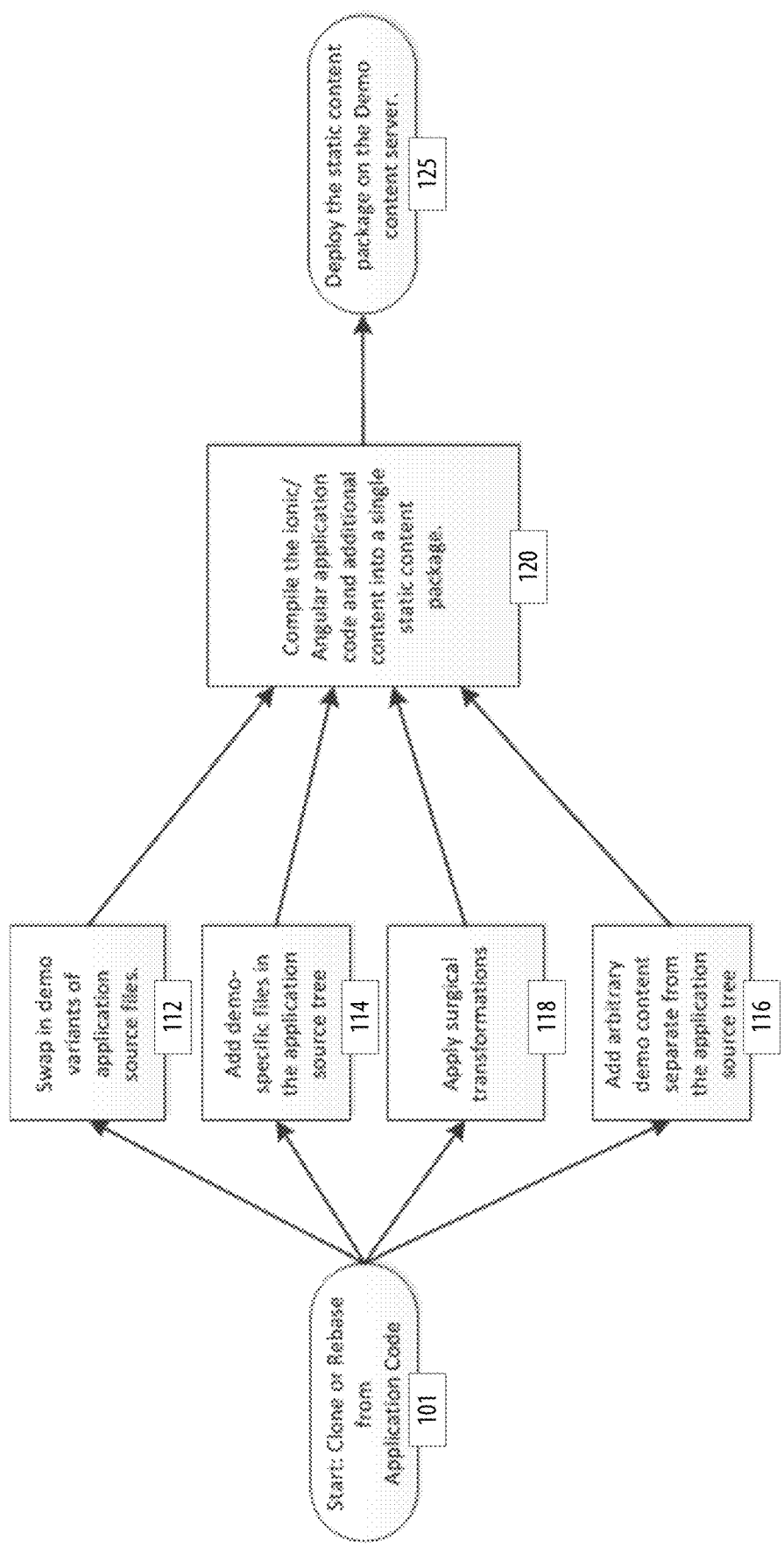

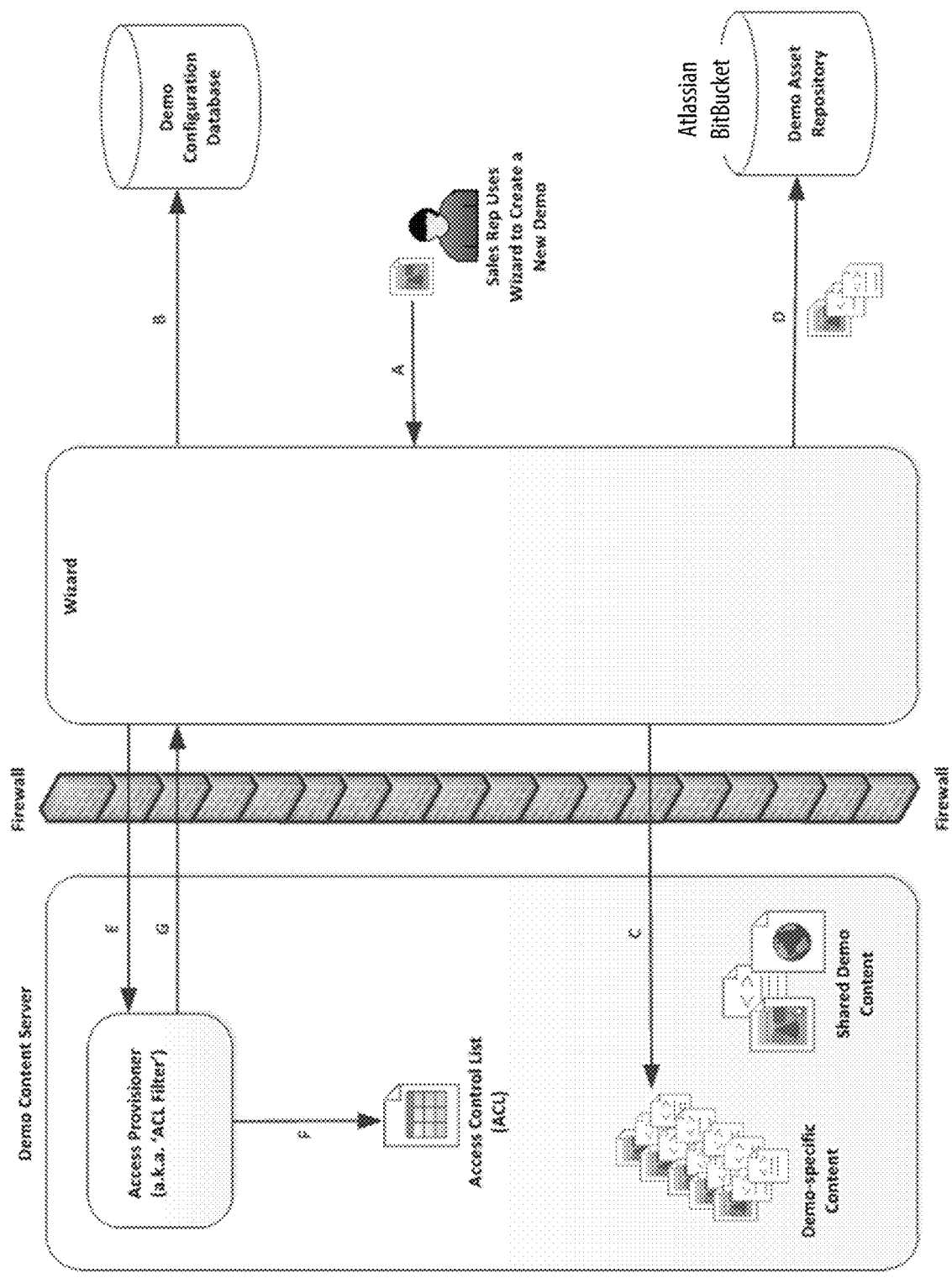
FIGURE 2: ACR ARCHITECTURE

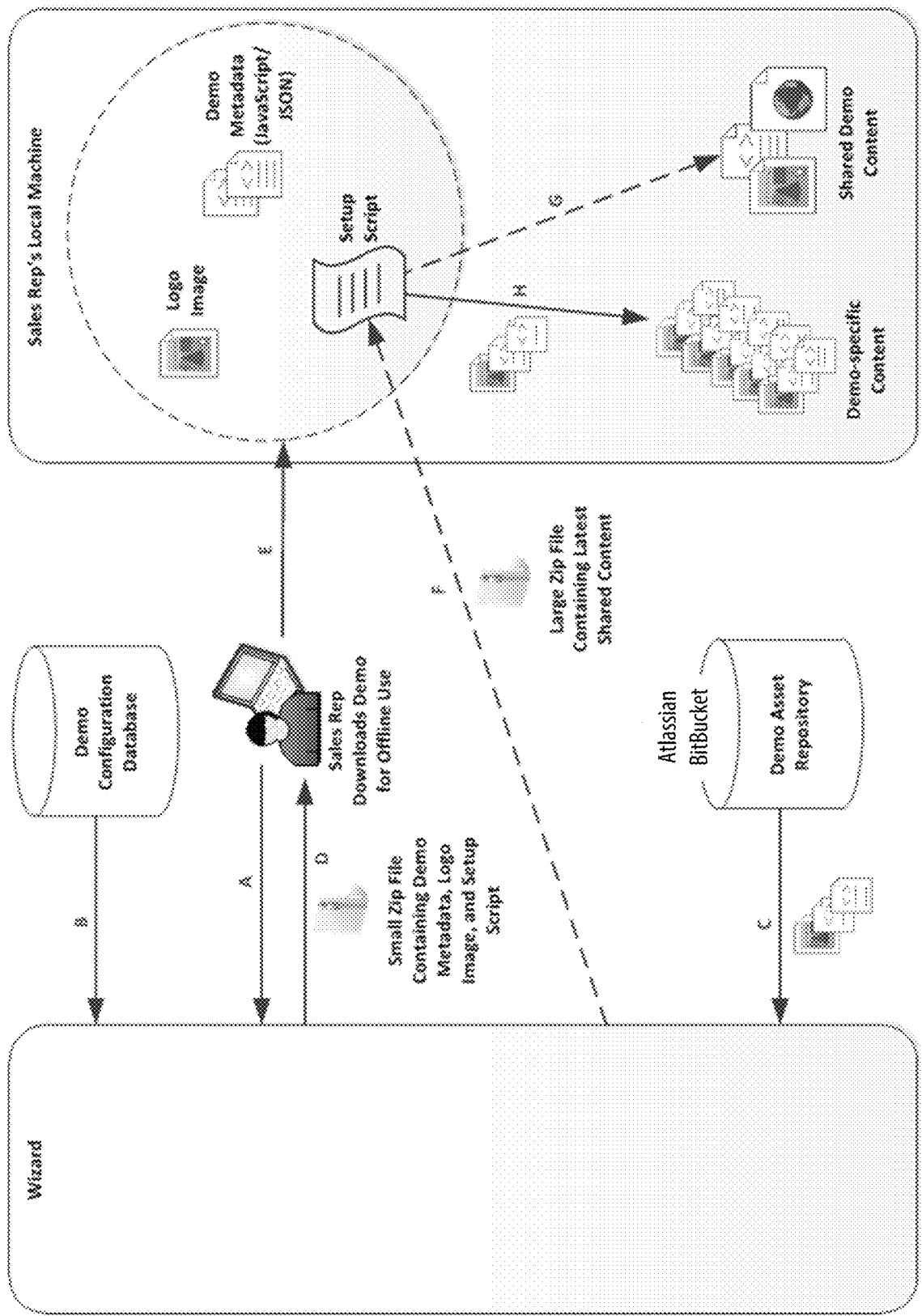

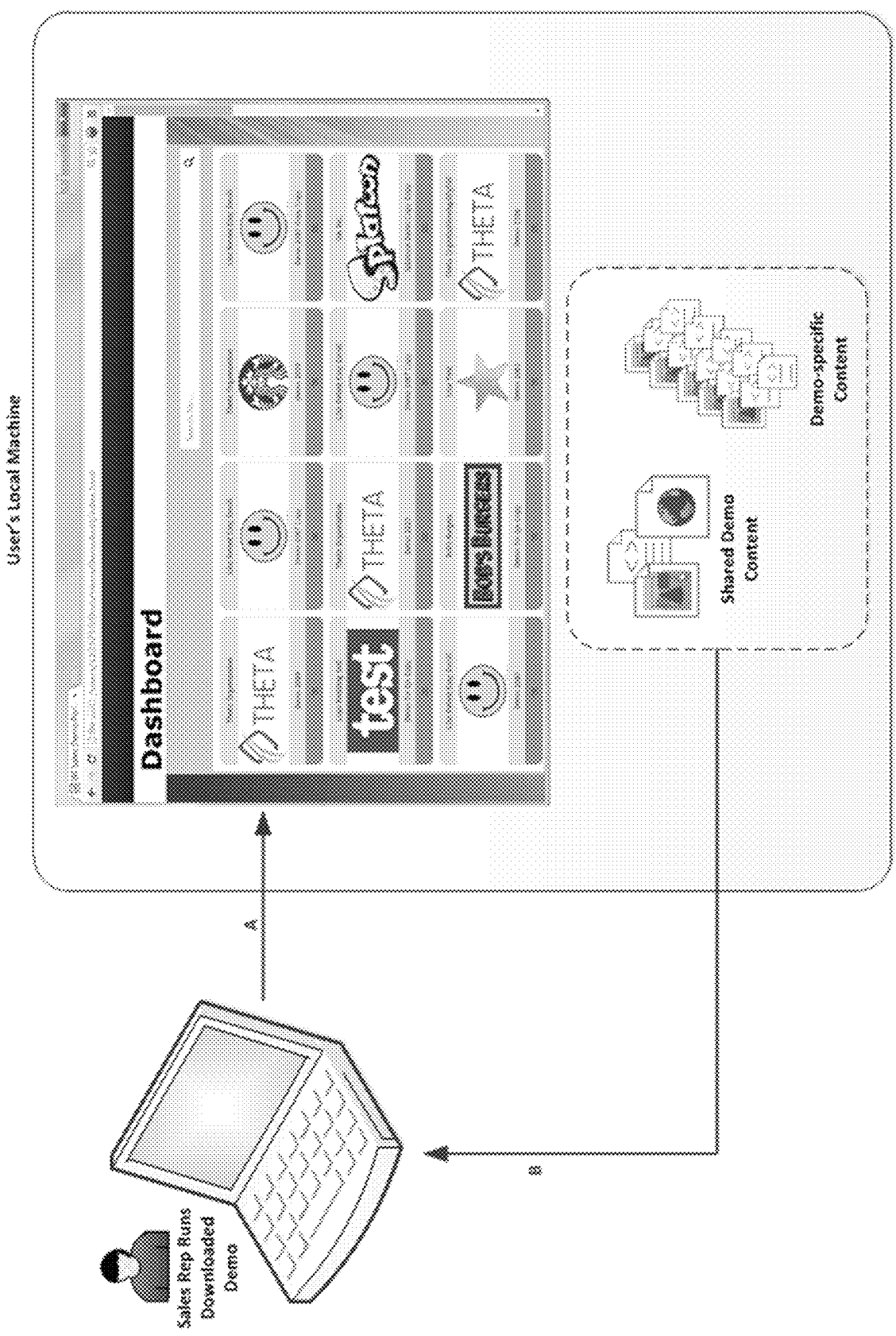
FIGURE 4: ACR ARCHITECTURE

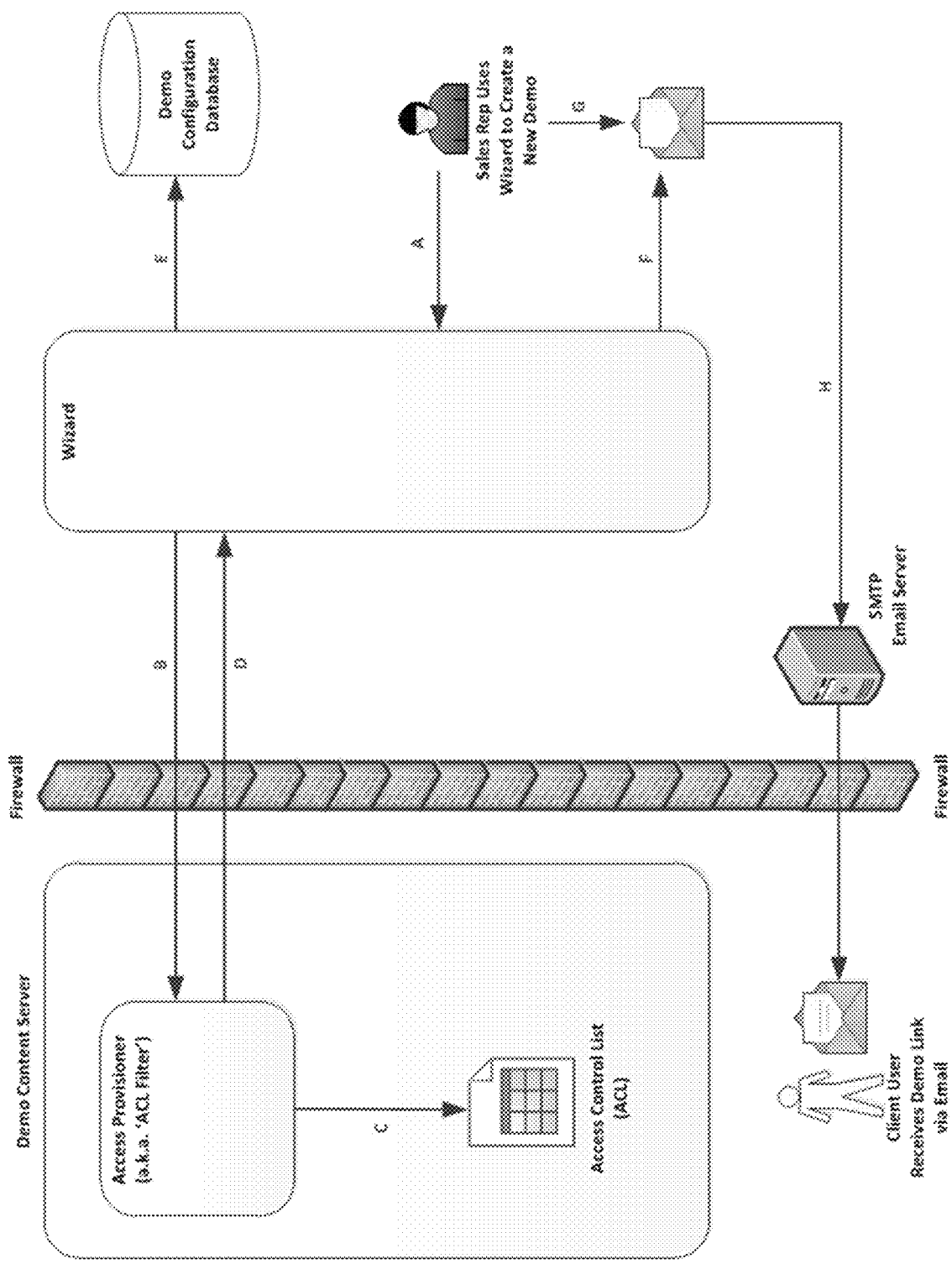
FIGURE 5: ACR ARCHITECTURE

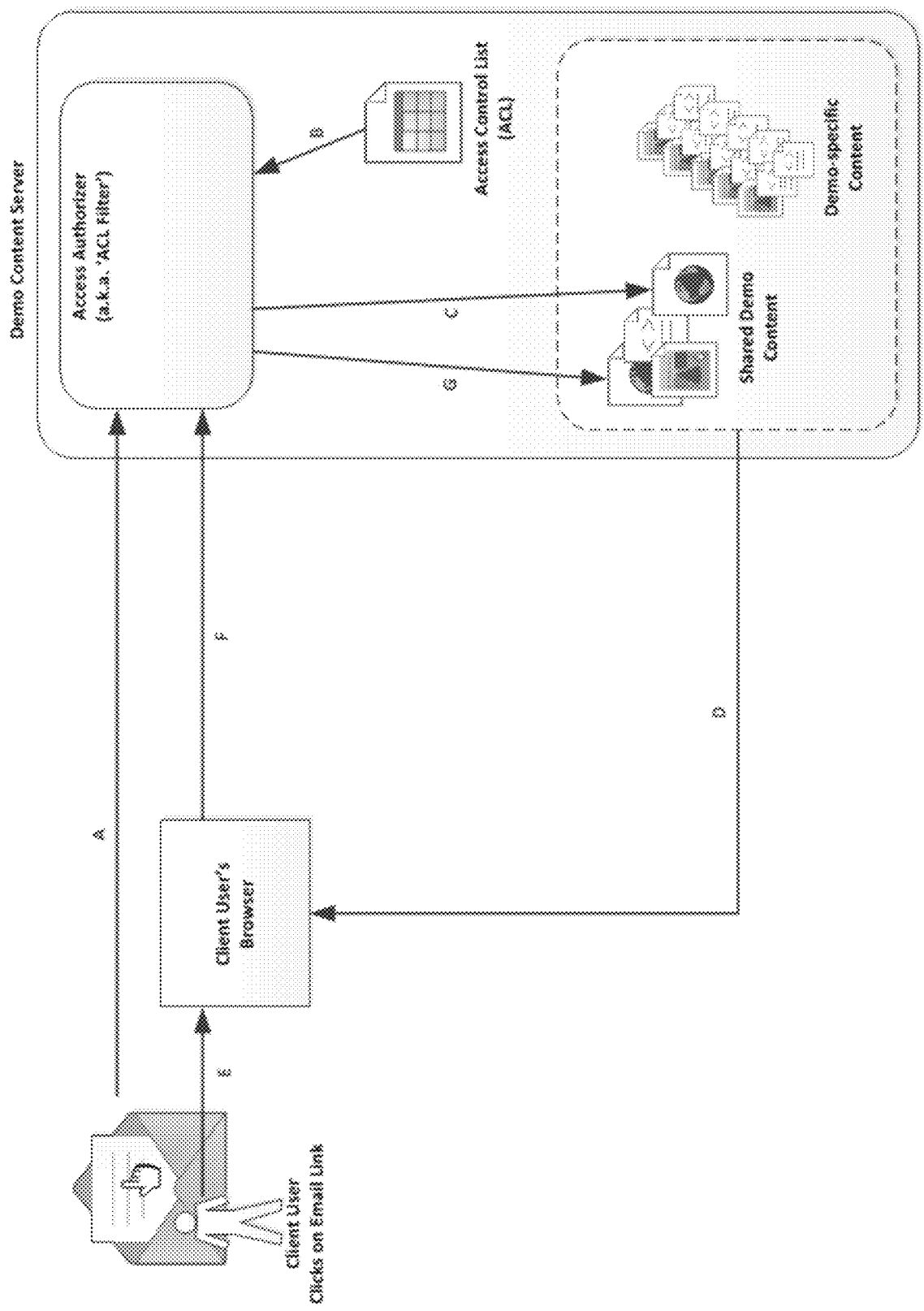
FIGURE 6: ACR ARCHITECTURE

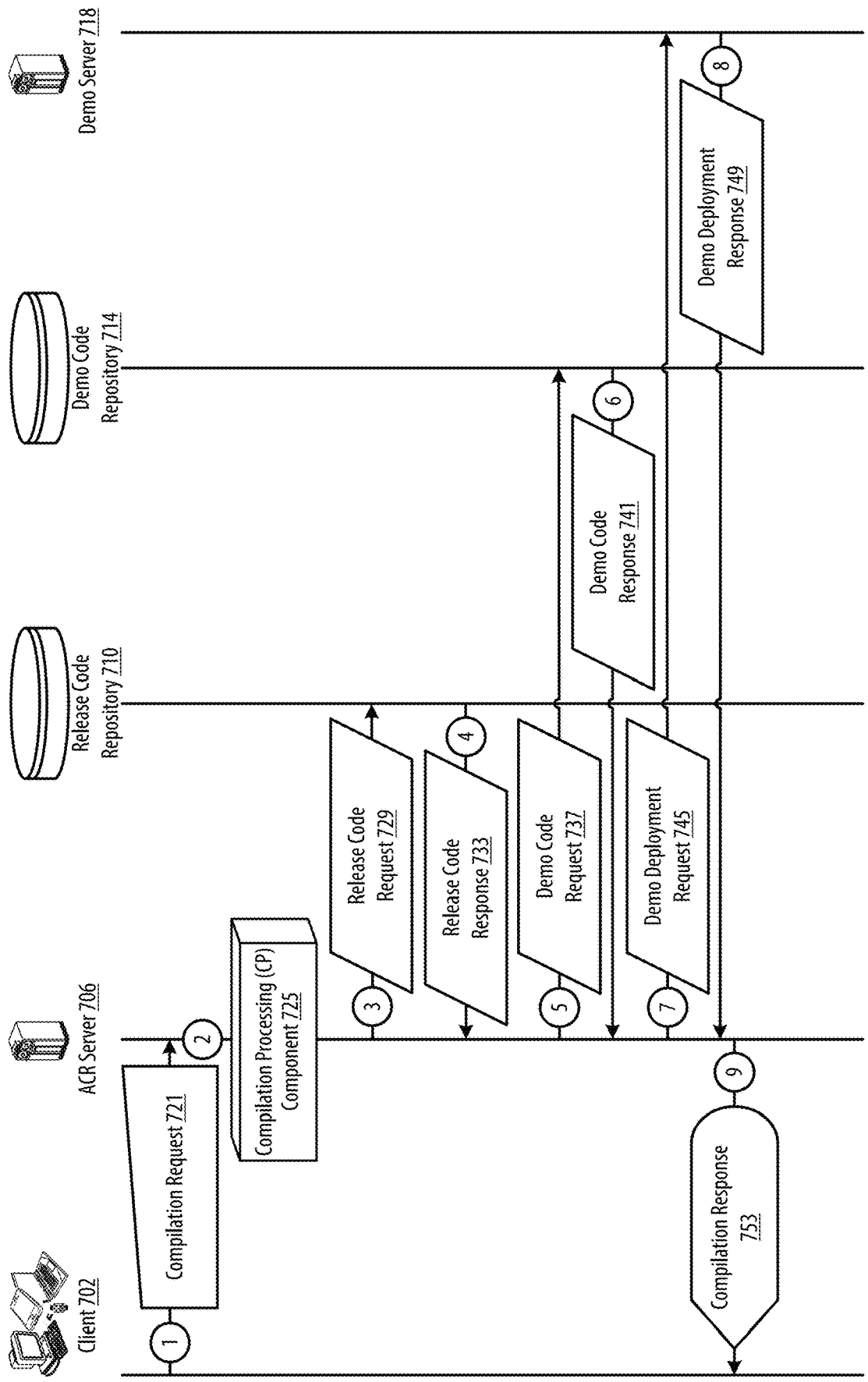

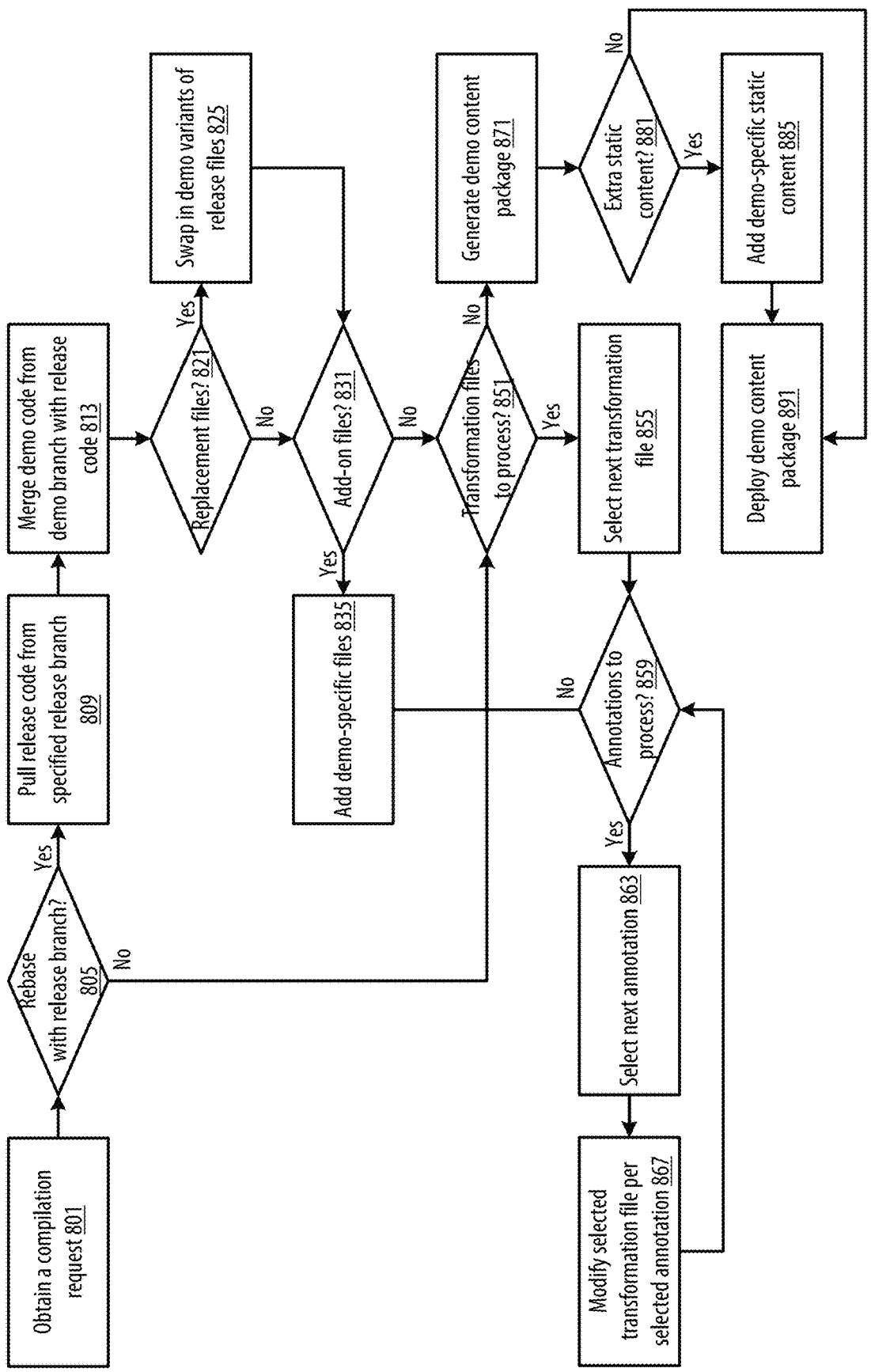
FIGURE 8: ACR CP COMPONENT

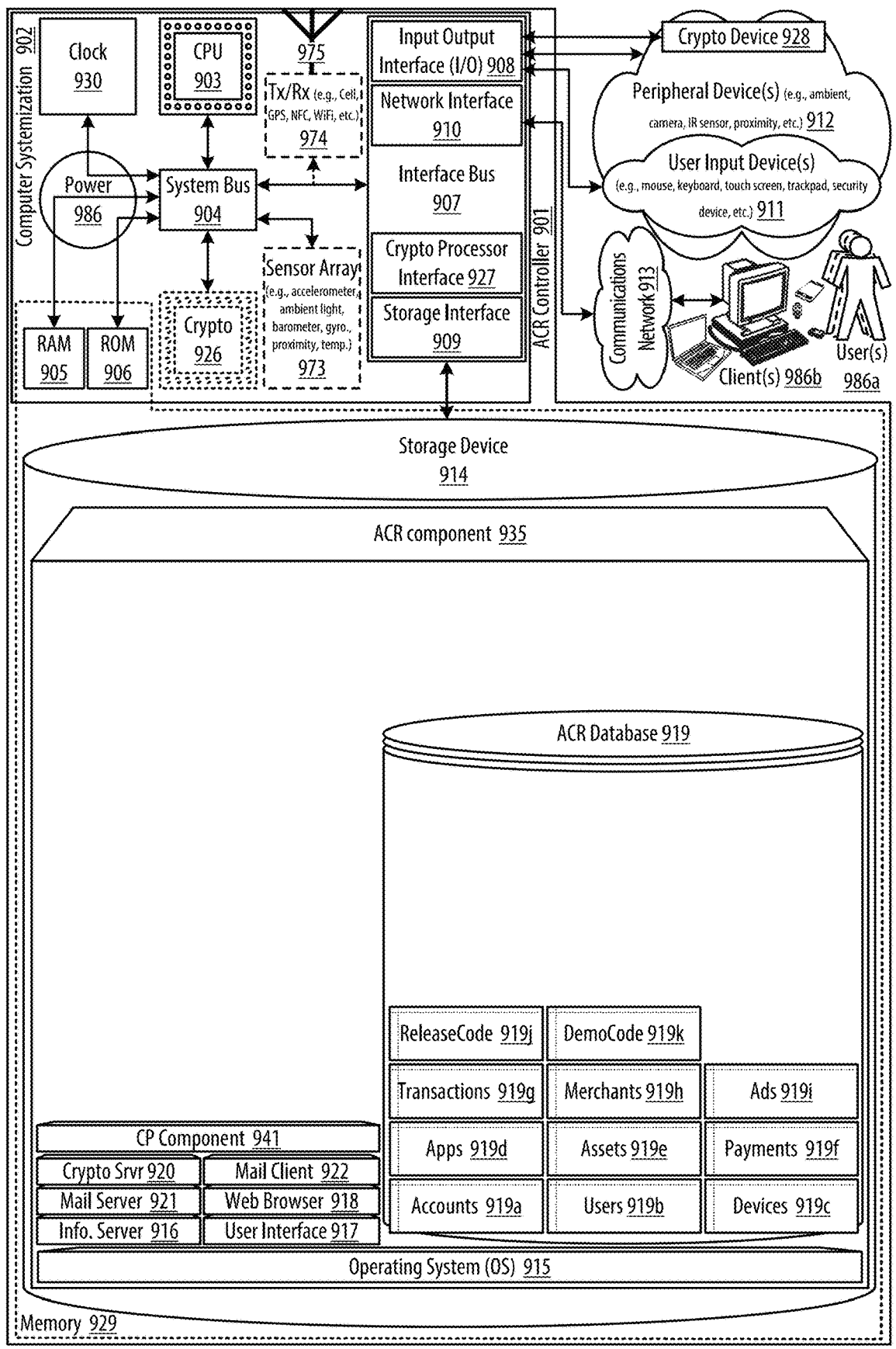
FIGURE 9: ACR Controller

US 10,922,060 B1

APPLICATION SOURCE CODE REUSE APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address compilers, and more particularly, include Application Source Code Reuse Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Versions of a software application that are provided to users for general use are typically referred to as production software or release software. Sometimes, demo versions of a software application are created to demonstrate potential new capabilities to select users.

BRIEF DESCRIPTION OF THE DRAWINGS

Appendices and/or drawings illustrating various, non-limiting, example, innovative aspects of the Application Source Code Reuse Apparatuses, Methods and Systems (hereinafter "ACR") disclosure, include:

FIG. 1 shows implementation case(s) for the ACR;
FIG. 2 shows an architecture for the ACR;
FIG. 3 shows an architecture for the ACR;
FIG. 4 shows an architecture for the ACR;
FIG. 5 shows an architecture for the ACR;
FIG. 6 shows an architecture for the ACR;
FIG. 7 shows a datagraph illustrating data flow(s) for the ACR;
FIG. 8 shows a logic flow illustrating embodiments of a compilation processing (CP) component for the ACR;
FIG. 9 shows a block diagram illustrating embodiments of a ACR controller.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Application Source Code Reuse Apparatuses, Methods and Systems (hereinafter "ACR") transforms compilation request inputs, via ACR components (e.g., CP, etc. components), into compilation response outputs. The ACR components, in various embodiments, implement advantageous features as set forth below.

Introduction

The ACR provides unconventional features (e.g., reuse of application source code in order to build variants of applications that have altered behavior for targeted alternate usage contexts such as sales demos or other arbitrary augmented feature/functionality prototyping demonstrations) that were never before available in compilers.

There are many development contexts—such as sales demos, prototyped features/functionality demonstrations to technical and/or business audiences, or application variations that have altered behavior (whether slight or significant) for arbitrary usage contexts (e.g., targeted data collection, etc.), etc.—in which production of augmented or altered application features and/or functionality may be beneficial.

Previous techniques to accomplish application source code reuse for sales demos—most of which involve either retargeting/reconfiguring prebuilt application assets or reusing assets 'scraped' (locally saved) from running web application pages loaded into web browsers—are nonviable and unscalable from the standpoint of being able to facilitate maintaining source application features/functionality over time (i.e., staying in 'lock step' with the evolving features/functionality of the source application).

In various embodiments, the ACR may include: (1) a cpp-like preprocessing approach to source code reuse combined with an easy-to-use annotation language and source code transformation tool which provides both 'deannotation' capability and annotation-directed transformation capability, (2) a source code management branching and folder-based code separation strategy that provides an optimized framework in which to perform scalable updates to transformed code so as to assimilate new application source code features/functions in the transformation target.

In various embodiments, aspects of the ACR may include:
Demo-specific code is kept separate from the application code
Demo utilizes separate branches in the application (product) repository
Demo-specific files are in a separate "demo" root directory at the top level of the git repo
Demo-specific changes are not merged with the application (product) code/branches
Merging of code in the repo for demo purposes is in one direction—i.e., to demo branches (and not to application/product branches)
A newly-invented transformation language (dubbed 'mod') and an associated transformation tool
Demo-ization may be accomplished by applying demo-specific transformations to the application codebase usually using some combination of these methods:
Automated file modification ('transformation')
Wholesale copying of a demo-specific file variant, effectively replacing the application/product file prior to compiling
Inclusion of 'add-on' code (intended for compilation)
Inclusion of 'add-on' content The transformed, (e.g., mobile) demo-ready code may be deployed on the demo platform as compiled Ionic/Angular static content package.

ACR

FIG. 1 shows implementation case(s) for the ACR. In FIG. 1, an exemplary code reuse implementation case to facilitate deploying a demo content package for a demo application to a demo content server is illustrated. At 101, application source code (e.g., from a release code repository) may be cloned (e.g., to a demo code repository). Alternatively, existing demo source code may be rebased (e.g., merged) with changes from the application source code. At 112, demo variants of application source files may be swapped into replace specified application source code files. At 114, demo-specific files may be added in the application source tree. At 116, arbitrary demo-specific content may be added separate from the application source tree. At 118, transformation files may be modified based on provided annotations.

At 120, the resulting application code (e.g., Ionic/Angular application source tree) and/or additional content may be compiled to generate a demo content package (e.g., a single static content package). At 125, the demo content package may be deployed on a demo content server.

FIG. 2 shows an architecture for the ACR. In FIG. 2, an embodiment of how a wizard application (e.g., executing on an application server) may be utilized to create and/or edit a demo application is illustrated. At A, a user (e.g., a sales representative) may utilize the wizard application to initiate creation or editing of the demo application. In one implementation, the user may select and/or customize (e.g., by uploading a logo image for the demo application) a demo content package deployed on a demo content server. At B, the wizard application may write a demo configuration record (e.g., including an access ID, newly-created in cases where the user is creating a new demo) for the demo application to a demo configuration database. At C, the wizard application may securely copy customized demo-specific content (e.g., the logo image, JavaScript/JSON files containing demo-specific metadata) to the demo content server. At D, the wizard application may programmatically push the customized demo-specific content to a demo asset repository (e.g., to Atlassian BitBucket or other centralized Git server using a Git API). At E, the wizard application may call an access provisioner to provision access to the demo application for wizard application users (e.g., passing the access ID, demo ID, an expiration date, and the user's ID). At F, the access provisioner may update an Access Control List (ACL) file with the information sent by the wizard application to grant authenticated wizard application users access to run the new or edited demo. At G, the access provisioner may send a response to the wizard application indicating whether or not the access was successfully provisioned. If there was a problem, the wizard application may display an error message to the user. If the access was successfully provisioned, the user may run the new or edited demo.

FIG. 3 shows an architecture for the ACR. In FIG. 3, an embodiment of how a wizard application (e.g., executing on an application server) may be utilized to deploy a demo application (e.g., created as discussed with regard to FIG. 2) on a user's local machine is illustrated. At A, a user (e.g., a sales representative) may utilize the wizard application to initiate downloading the demo application (e.g., by clicking on a download link in the wizard application) to the user's local machine. At B, the wizard application may retrieve a demo configuration record for the demo application from a demo configuration database. At C, the wizard application may programmatically retrieve (e.g., customized) demo-specific assets of the demo application from a demo asset repository (e.g., from Adassian BitBucket or other centralized Git server using a Git API). At D, the wizard application may programmatically zip the customized demo-specific content (e.g., a setup script (e.g., setup.bat or setup.sh, depending upon whether the user is downloading to Windows or Linux); a logo image; a JavaScript file defining the demo configuration data object in JSON format; a JavaScript file defining the demo version, create/modify date stamps, and flags metadata in JSON format) and initiate downloading of the zip file to the user's local machine. At E, the zip file may be unzipped to the user's local machine and/or installed (e.g., via the setup script). At F, if (e.g., the latest version of) shared content is not installed on the user's local machine, the shared content (e.g., a base package) may be downloaded from the application server. At G, if the base package was downloaded, the setup script may install the base package on the user's local machine. At H, the setup script may install the customized demo-specific assets (e.g., generated via the CP component) of the demo application on the user's local machine.

FIG. 4 shows an architecture for the ACR. In FIG. 4, an embodiment of how the user may utilize the demo application deployed on the user's local machine, as discussed with regard to FIG. 3, is illustrated. At A, the user may run the demo application (e.g., via a web browser). At B, as the user navigates through the demo application, the base package and/or the customized demo-specific assets of the demo application deployed on the user's local machine may be used to facilitate execution of the demo application.

FIG. 5 shows an architecture for the ACR. In FIG. 5, an embodiment of how a wizard application (e.g., executing on an application server) may be utilized to make a demo application (e.g., created as discussed with regard to FIG. 2) accessible to external users (e.g., prospective clients) from a demo content server is illustrated. At A, a user (e.g., a sales representative) may utilize the wizard application to select to share the demo application (e.g., by clicking on a share link in the wizard application). At B, the wizard application may generate an access ID (e.g., a special UUID token that is unique for this provisioned access) and may call an access provisioner to provision access to the demo application for wizard application users (e.g., passing the access ID, demo ID, an expiration date, and the user's ID). In one implementation, the access ID is a key that allows access to run the demo application specified by the demo configuration. At C, the access provisioner may update an Access Control List (ACL) file with the information sent by the wizard application to grant any user with the access ID access to run the new or edited demo. At D, the access provisioner may send a response to the wizard application indicating whether or not the access was successfully provisioned. If there was a problem, the wizard application may display an error message to the user. At E, the wizard application may update a demo configuration record for the demo application in a demo configuration database with information regarding the provisioned access. At F, the wizard application may generate (e.g., using an email client, such as Microsoft Outlook) an email that contains a link configured to run the demo. In one implementation, the link may be configured to include the demo ID and/or the access ID corresponding to the provisioned access to the demo application. At G, the user may modify the generated email as desired. At H, the generated email may be sent to another user (e.g., to an external user via an SMTP email server).

FIG. 6 shows an architecture for the ACR. In FIG. 6, an embodiment of how an external user may utilize the shared demo application deployed on the demo content server, as discussed with regard to FIG. 5, is illustrated. At A, the external user may run the demo application (e.g., via a web browser) by clicking on the email link. At B, the access provisioner may check the ACL file to verify that the correct access ID that allows access to run the demo application was provided in the link. At C, the access provisioner may ascertain demo content (e.g., shared demo content and/or demo-specific content (e.g., generated via the CP component)) to provide to the external user. At D, the specified demo content may be provided to the external user's web browser to facilitate execution of the demo application. At E, the external user may navigate through the demo application. At F, the external user's web browser may request additional demo content corresponding to the external user's navigation through the demo application. At G, the access provisioner may ascertain additional demo content to be provided to the external user's web browser.

FIG. 7 shows a datagraph illustrating data flow(s) for the ACR. In FIG. 7, a client 702 (e.g., of a user) may send a compilation request 721 to a ACR server 706 to facilitate compilation and/or deployment of a demo application by reusing application source code. For example, the client may be a desktop, a laptop, a tablet, a smartphone, a smartwatch, and/or the like that is executing a client application. In one implementation, the compilation request may include data such as a request identifier, an application identifier, an application version, file modification information, and/or the like. In one embodiment, the client may provide the following example compilation request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.com</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>ACR.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
```

```
    <client_product_type>Nexus S</client_product_type>
    <client_serial_number>YXXXXXXXXZ</client_serial_number>
    <client_UDID>FXXXXXXXXX-XXXX-XXXX-XXXX-XXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
  </client_details>
  <client_details> //Mac Desktop with Webbrowser
    <client_IP>10.0.0.123</client_IP>
    <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
    <client_product_type>MacPro5,1</client_product_type>
    <client_serial_number>YXXXXXXXXZ</client_serial_number>
    <client_UDID>FXXXXXXXXX-XXXX-XXXX-XXXX-XXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
  </client_details>
  <compilation_request>
    <request_identifier>ID_request_1</request_identifier>
    <application_identifier>ID_application_1</application_identifier>
    <demo_application_version>3.1_DEMO</demo_application_version>
    <release_application_version>3.0</release_application_version>
    <modifications>
      <file>
        <file_name>file1.html</file_name>
        <modification_type>REPLACEMENT</modification_type>
      </file>
      <file>
        <file_name>file2.css</file_name>
        <modification_type>ADDON</modification_type>
      </file>
      <file>
        <file_name>file3.jpg</file_name>
        <modification_type>EXTRA_CONTENT</modification_type>
      </file>
      <file>
        <file_name>file4.js</file_name>
        <modification_type>TRANSFORMATION</modification_type>
      </file>
      ...
    </modifications>
  </compilation_request>
</auth_request>
```

A compilation processing (CP) component 725 may utilize data provided in the compilation request to facilitate generating a demo content package and/or deployment of the demo application. See FIG. 8 for additional details regarding the CP component.

The ACR server may send a release code request 729 to a release code repository 710 to obtain production application source code. In one implementation, the release code request may include data such as a request identifier, an application identifier, an application version, production application source code files to obtain, and/or the like. In one embodiment, the ACR server may provide the following example release code request, substantially in the form of a HTTP(S) POST message including XML-formatted data, as provided below:

```
POST/release_code_request.php HTTP/1.1
Host: www.server.com
Content-Type: Application/XML
Content-Length: 667
<?XML version="1.0" encoding="UTF-8" ?>
<release_code_request>
  <request_identifier>ID_request_2</request_identifier>
  <application_identifier>ID_application_1</application_identifier>
  <application_version>3.0</application_version>
  <files>ALL</files>
</release_code_request>
```

The release code repository may send a release code response 733 to the ACR server with the requested production application source code files. In one implementation, the release code response may include data such as a response identifier, the requested production application source code files, and/or the like. In one embodiment, the release code repository may provide the following example release code response, substantially in the form of a HTTP(S) POST message including XML-formatted data, as provided below:

```
POST/release_code_response.php HTTP/1.1
Host: www.server.com
Content-Type: Application/XML
Content-Length: 667
<?XML version="1.0" encoding="UTF-8" ?>
<release_code_response>
  <response_identifier>ID_response_2</response_identifier>
  <files>requested production appLication fiLes</files>
</release_code_response>
```

The ACR server may send a demo code request 737 to a demo code repository 714 to obtain demo-specific source code. In one implementation, the demo code request may include data such as a request identifier, an application identifier, an application version, demo source code files to obtain, and/or the like. In one embodiment, the ACR server may provide the following example demo code request, substantially in the form of a HTTP(S) POST message including XML-formatted data, as provided below:

```
POST/demo_code_request.php HTTP/1.1
Host: www.server.com
Content-Type: Application/XML
Content-Length: 667
<?XML version="1.0" encoding="UTF-8" ?>
<demo_code_request>
    <request_identifier>ID_request_3</request_identifier>
    <application_identifier>ID_application_1</application_identifier>
    <application_version>3.1_DEMO</application_version>
    <files>ALL</files>
</demo_code_request>
```

The demo code repository may send a demo code response 741 to the ACR server with the requested demo source code files. In one implementation, the demo code response may include data such as a response identifier, the requested demo source code files, and/or the like. In one embodiment, the demo code repository may provide the following example demo code response, substantially in the form of a HTTP(S) POST message including XML-formatted data, as provided below:

```
POST/demo_code_response.php HTTP/1.1
Host: www.server.com
Content-Type: Application/XML
Content-Length: 667
<?XML version="1.0" encoding="UTF-8" ?>
<demo_code_response>
    <response_identifier>ID_response_3</response_identifier>
    <files>requested demo fiLes</files>
</demo_code_response>
```

The ACR server may send a demo deployment request 745 to a demo server 718 to facilitate deployment of the generated demo content package. In one implementation, the demo deployment request may include data such as a request identifier, a request type, a demo content package, and/or the like. In one embodiment, the ACR server may provide the following example demo deployment request, substantially in the form of a HTTP(S) POST message including XML-formatted data, as provided below:

```
POST/demo_deployment_request.php HTTP/1.1
Host: www.server.com
Content-Type: Application/XML
Content-Length: 667
<?XML version="1.0" encoding="UTF-8" ?>
<demo_deployment_request>
    <request_identifier>ID_request_4</request_identifier>
    <request_type>DEPLOY_DEMO</request_type>
    <demo_content_package>generated demo content package</demo_content_package>
</demo_deployment_request>
```

The demo server may send a demo deployment response 749 to the ACR server to confirm that the generated demo content package was deployed successfully. In one implementation, the demo deployment response may include data such as a response identifier, a status, and/or the like. In one embodiment, the demo server may provide the following example demo deployment response, substantially in the form of a HTTP(S) POST message including XML-formatted data, as provided below:

```
POST/demo_deployment_response.php HTTP/1.1
Host: www.server.com
Content-Type: Application/XML
Content-Length: 667
<?XML version="1.0" encoding="UTF-8" ?>
<demo_deployment_response>
    <response_identifier>ID_response_4</response_identifier>
    <status>OK</status>
</demo_deployment_response>
```

The ACR server may send a compilation response 753 to the client to inform the user that the demo application was generated and/or deployed successfully. In one implementation, the compilation response may include data such as a response identifier, a status, and/or the like. In one embodiment, the ACR server may provide the following example compilation response, substantially in the form of a HTTP(S) POST message including XML-formatted data, as provided below:

```
POST/compilation_response.php HTTP/1.1
Host: www.server.com
Content-Type: Application/XML
Content-Length: 667
<?XML version="1.0" encoding="UTF-8" ?>
<compilation_response>
    <response_identifier>ID_response_1</response_identifier>
    <status>OK</status>
</compilation_response>
```

FIG. 8 shows a logic flow illustrating embodiments of a compilation processing (CP) component for the ACR. In FIG. 8, a compilation request may be obtained at 801. For example, the compilation request may be obtained as a result of a user request to generate and/or deploy a demo content package for a demo application based on a source production application.

A determination may be made at 805 whether to rebase demo code from a demo branch with production code from a release branch. For example, the demo code may be rebased with the release code to keep the demo application in sync with the evolving features and/or functionality of the source production application. In one embodiment, the demo code may be rebased when a new version of the source production application is available from the release branch. It is to be understood that, instead of the release version, any other version of the source production application may also be used for rebasing.

If the demo code should be rebased, the release code may be pulled from a specified release branch at 809, and the demo code may be merged the release code at 813. For example, the release branch and/or the demo branch may be separate directories in a Git repository. In various implementations, the demo code may be updated as follows:

Alternative 1—Rebasing
git checkout demo
git rebase production
Alternative 2—Merging
git checkout demo
git merge production A determination may be made at 821 whether the demo code utilizes replacement files. If the demo code utilizes replacement files, demo variants of release files may be swapped in at 825. For example, the demo code may utilize replacement files when most lines of a production file should be modified for the demo application and/or the production file is not likely to change over time. In one implementation, existing release files in the rebased demo code may be replaced by demo-specific files with the same names.

A determination may be made at 831 whether the demo code utilizes add-on files. If the demo code utilizes add-on files, demo-specific add-on files may be added at 835. For example, the demo code may utilize add-on files when creating a new component, class, service, etc. and/or reusing code from another application and/or adding a new file to be included in the build process (e.g., to be resolved at build-time). In one implementation, new add-on source files may be copied to the demo branch (e.g., to the demo branch directory in the Git repository).

A determination may be made at 851 whether there remain transformation files in the demo code to process. For example, the demo code may utilize transformation files when a file that should be modified for the demo application is likely to change over time. In one implementation, each of the transformation files in the demo code may be processed. If there remain transformation files to process, the next transformation file may be selected for processing at 855.

A determination may be made at 859 whether there remain annotations in the selected transformation file to process. In one implementation, each of the annotations in the selected transformation file may be processed. In one embodiment, a transformation tool may be utilized to process annotations. In one implementation, the transformation tool may utilize the following command line arguments:

| Argument | Values |
|---|---|
|  | Some valid languages are: |
| -l | typescript |
|  | html |
|  | json |
|  | scss |
|  | javascript |
|  | java |
|  | C |
|  | C++ |
| -i | path to annotated input file |
| -o | path to output file (transformed) |

In one embodiment, the transformation tool may be utilized to generate a demo-specific version of the corresponding release file by processing the annotations in the selected transformation file. It is to be understood that the transformation tool may be utilized to process code written for client-side programming contexts and for server-side programming contexts. In another embodiment, the transformation tool may be utilized to test the selected transformation file for syntactical annotation correctness by deannotating (e.g., removing annotations from) the selected transformation file and verifying (e.g., using the diff command) that the deannotated version matches (e.g., is identical to) the corresponding release file. In one implementation, the transformation tool may be configured to test the selected transformation file for syntactical annotation correctness and, if syntactical annotation correctness is verified, to transform the selected transformation file into a demo-specific version. If there remain annotations to process, the next annotation may be selected for processing at 863.

The selected transformation file may be modified in accordance with the selected annotation at 867. In one implementation, the transformation tool may process the following annotations:

| Annotation | Meaning |
|---|---|
| ~ | a single trailing comment line that is NOT copied to the output |
| ~~ | embed in the output a single comment line that speaks to the transformation |
| ~~+ | start a comment block that speaks to the transformation that follows the comment block |
| ~~- | end the comment block |
| ~An | add line below annotation |
| ~A+ | add code block |
| ~A- | end add code block |
| ~Af<filespec> | add code/content from filespec below annotation |
| ~Cbn | comment out next line using block comment syntax |
| ~Cb+ | start comment code block |
| ~Cb- | end comment code block |
| ~Ctn | trailing comment next line |
| ~Ct+ | trailing comment block start |
| ~Ct- | trailing comment block end |
| ~Dn | delete next line |
| ~D+ | start delete code block |
| ~D- | end delete code block |
| ~Sn~oldregex~subnew~ | substitute next line as specified via regular expressions |
| ~S+~oldregex~subnew~ | start substitution code block as specified - apply globally |
| ~S- | end substitution code block |

In one embodiment, an annotation may be used to add, remove, substitute, alter, comment on, and/or the like specified code in a transformation file. For example, annotations may be used to change user interface features, data sources (e.g., by modifying embedded SQL statements), processing logic, and/or the like.

If there do not remain transformation files in the demo code to process, a demo package (containing content and/or code) may be generated at 871. In various implementations, the transformed application code (e.g., Ionic/Angular application source code; server-side source code such as that written in Java, C, C++, etc.) may be compiled into demo code and/or content packages (e.g., a single static content package; a single server application, web service, or other component (e.g., containerized or not using Tomcat, Docker, etc.; cloud or not; on-premises or off-premises, etc.)); or a set of packages that are logically related—e.g., multiple code and/or content packages (containing any combination of client-side static content, rich client-side application code, server-side application code, separately-built libraries and/or services, etc.) that together represent a logical client/server [web or other] application). For example: a resulting demo content package may be configured for a specified platform (e.g., Android, iOS, web browser, Microsoft Windows, Linux, Amazon Web Services, Microsoft Azure), build environment, deployment configuration (e.g., adhoc, appstore), and/or the like; or a resulting demo server-side application code package may be built as a Docker image that can run on any Docker-enabled server or in any Docker-enabled cloud implementation. It is to be understood that the ACR may be utilized for any development contexts, programming languages, build methods, deployment methods, hosting mechanisms, and/or the like.

A determination may be made at 881 whether the demo application utilizes extra static content. If the demo application utilizes extra static content, demo-specific extra static content files may be added to the demo content package at 885 (e.g., essentially 'post-build'). For example, the demo application may utilize extra static content files when making additional content (e.g., data, multimedia, etc.) accessible at run-time (e.g., accessible in a demo deployment environment, deployed in the demo content package on a demo content server). In one implementation, the extra static content files may be copied to a demo content folder of the demo content package. For example, the Node.js fs-extra module may be utilized to copy the extra static content files to the demo content folder of the demo content package (e.g., compiled Ionic/Angular static content package).

The demo content package may be deployed at 891. For example, the demo content package and/or a setup script may be copied and/or installed. In one implementation, the demo content package may be deployed on a demo content server. In another implementation, the demo content package may be deployed on a user's client.

ACR Controller

FIG. 9 shows a block diagram illustrating embodiments of a ACR controller. In this embodiment, the ACR controller 901 may serve to aggregate, process, store, search, serve, identify, instruct, generate, match, and/or facilitate interactions with a computer through compilers technologies, and/or other related data.

Users, which may be people and/or other systems, may engage information technology systems (e.g., computers) to facilitate information processing. In turn, computers employ processors to process information; such processors 903 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the ACR controller 901 may be connected to and/or communicate with entities such as, but not limited to: one or more users from peripheral devices 912 (e.g., user input devices 911); an optional cryptographic processor device 928; and/or a communications network 913.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The ACR controller 901 may be based on computer systems that may comprise, but are not limited to, components such as: a computer systemization 902 connected to memory 929.

Computer Systemization

A computer systemization 902 may comprise a clock 930, central processing unit ("CPU(s)" and/or "processor(s)" (these terms are used interchangeable throughout the disclosure unless noted to the contrary)) 903, a memory 929 (e.g., a read only memory (ROM) 906, a random access memory (RAM) 905, etc.), and/or an interface bus 907, and most frequently, although not necessarily, are all interconnected and/or communicating through a system bus 904 on one or more (mother)board(s) 902 having conductive and/or otherwise transportive circuit pathways through which instructions (e.g., binary encoded signals) may travel to effectuate communications, operations, storage, etc. The computer systemization may be connected to a power source 986; e.g., optionally the power source may be internal. Optionally, a cryptographic processor 926 may be connected to the system bus. In another embodiment, the cryptographic processor, transceivers (e.g., ICs) 974, and/or sensor array (e.g., accelerometer, altimeter, ambient light, barometer, global positioning system (GPS) (thereby allowing ACR controller to determine its location), gyroscope, magnetometer, pedometer, proximity, ultra-violet sensor, etc.) 973 may be connected as either internal and/or external peripheral devices 912 via the interface bus I/O 908 (not pictured) and/or directly via the interface bus 907. In turn, the transceivers may be connected to antenna(s) 975, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11 g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n, Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large super-computer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron; Apple's® A series of processors (e.g., A5, A6, A7, A8, etc.); ARM's® application, embedded and secure processors; IBM® and/or Motorola's Dragon-Ball and PowerPC; IBM's® and Sony's® Cell processor; Intel's® 80X86 series (e.g., 80386, 80486), Pentium, Celeron, Core (2) Duo®, i series (e.g., i3, i5, i7, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to various data processing techniques. Such instruction passing facilitates communication within the ACR controller and beyond through various interfaces. Should processing requirements dictate a greater amount speed and/or capacity, distributed processors (e.g., see Distributed ACR below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the ACR may be achieved by implementing a microcontroller such as CAST's® R8051XC2 microcontroller; Intel's® MCS 51 (i.e., 8051 microcontroller); and/or the like. Also, to implement certain features of the ACR, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the ACR component collection (distributed or otherwise) and/or features may be implemented via the microprocessor and/or via embedded components; e.g., via ASIC, coprocessor, DSP, FPGA, and/or the like. Alternately, some implementations of the ACR may be implemented with embedded components that are configured and used to achieve a variety of features or signal processing.

Depending on the particular implementation, the embedded components may include software solutions, hardware solutions, and/or some combination of both hardware/software solutions. For example, ACR features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the ACR features. A hierarchy of programmable interconnects allow logic blocks to be interconnected as needed by the ACR system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the ACR may be developed on FPGAs and then migrated into a fixed version that more resembles ASIC implementations. Alternate or coordinating implementations may migrate ACR controller features to a final ASIC instead of or in addition to FPGAs. Depending on the implementation all of the aforementioned embedded components and microprocessors may be considered the "CPU" and/or "processor" for the ACR.

Power Source

The power source 986 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the ACR thereby providing an electric current to all subsequent components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, variously although not necessarily in the form of adapter cards, such as but not limited to: input output interfaces (I/O 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 913, the ACR controller is accessible through remote clients 933b (e.g., computers with web browsers) by users 933a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed ACR below), architectures may similarly be employed to pool, load balance, and/or otherwise decrease/increase the communicative bandwidth required by the ACR controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user, peripheral devices 912 (e.g., input devices 911), cryptographic processor devices 928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 912 may be connected and/or communicate to I/O and/or other facilities of the like such as network interfaces, storage interfaces, directly to the interface bus, system bus, the CPU, and/or the like. Peripheral devices may be external, internal and/or part of the ACR controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 911 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the ACR controller may be embodied as an embedded, dedicated, and/or monitor-less (i.e., headless) device, wherein access would be provided over a network interface connection.

Cryptographic units such as, but not limited to, microcontrollers, processors 926, interfaces 927, and/or devices 928 may be attached, and/or communicate with the ACR controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+ MB/s of cryptographic instructions; VLSI Technology's® 33 MHz 6868; and/or the like.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the ACR controller and/or a computer systemization may employ various forms of memory 929. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 929 will include ROM 906, RAM 905, and a storage device 914. A storage device 914 may be any various computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 929 may contain a collection of program and/or database components and/or data such as, but not limited to: operating system component(s) 915 (operating system); information server component(s) 916 (information server); user interface component(s) 917 (user interface); Web browser component(s) 918 (Web browser); database(s) 919; mail server component(s) 921; mail client component(s) 922; cryptographic server component(s) 920 (cryptographic server); the ACR component(s) 935; and/or the like (i.e., collectively a component collection). These components may be stored and accessed from the storage devices and/or from storage devices accessible through an interface bus. Although unconventional program components such as those in the component collection may be stored in a local storage device 914, they may also be loaded and/or stored in memory such as: peripheral devices, RAM, remote storage facilities through a communications network, ROM, various forms of memory, and/or the like.

Operating System

The operating system component 915 is an executable program component facilitating the operation of the ACR controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millenium/Mobile/NT/Vista/XP (Server)®, Palm OS®, and/or the like. Additionally, for robust mobile deployment applications, mobile operating systems may be used, such as: Apple's iOS®; China Operating System COS®; Google's Android; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the ACR controller to communicate with other entities through a communications network 913. Various communication protocols may be used by the ACR controller as a subcarrier transport mechanism for interaction, such as, but not limited to: multicast, TCP/IP, UDP, unicast, and/or the like.

Information Server

An information server component 916 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects®, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the ACR controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the ACR database 919, operating systems, other program components, user interfaces, Web browsers, and/or the like.

Access to the ACR database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the ACR. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, wherein the resulting command is provided over the bridge mechanism to the ACR as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, menus, scrollers, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other web-browser/cloud based client OSs); Microsoft's Windows® varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface®, any of which may be used and) provide a baseline and means of accessing and displaying information graphically to users.

A user interface component 917 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 918 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the ACR enabled nodes. The combined application may be nugatory on systems employing Web browsers.

Mail Server

A mail server component 921 is a stored program component that is executed by a CPU 903. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective–) C (++), C# and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the ACR. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the ACR mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 922 is a stored program component that is executed by a CPU 903. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the ACR may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to allow the ACR component to engage in secure transactions if so desired. The cryptographic component facilitates the secure accessing of resources on the ACR and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The ACR Database

The ACR database component 919 may be embodied in a database and its stored data. The database is a stored program component, which is executed by the CPU; the stored program component portion configuring the CPU to process the stored data. The database may be a fault tolerant, relational, scalable, secure database such as MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the ACR database may be implemented using various other data-structures, such as an array, hash, (linked) list, struct, structured text file (e.g., XML), table, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the ACR database is implemented as a data-structure, the use of the ACR database 919 may be integrated into another component such as the ACR component 935. Also, the database may be implemented as a mix of data structures, objects, and relational structures. Databases may be consolidated and/or distributed in countless variations (e.g., see Distributed ACR below). Portions of databases, e.g., tables, may be exported and/or imported and thus decentralized and/or integrated.

In one embodiment, the database component 919 includes several tables 919*a-k*:

An accounts table 919*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 919*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a ACR);

An devices table 919*c* includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 919*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 919*e* includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSeriaNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 919*f* includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 919*g* includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 919*h* includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like; An ads table 919*i* includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

A release code table 919*j* includes fields such as, but not limited to: applicationID, applicationVersion, fileName, fileLocation, fileLinkedAssets, fileCheckoutStatus, fileEditHistory, fileVersion, and/or the like;

A demo code table 919*k* includes fields such as, but not limited to: applicationID, applicationVersion, fileName, fileLocation, fileLinkedAssets, fileCheckoutStatus, fileEditHistory, fileModificationType, fileVersion, and/or the like.

In one embodiment, the ACR database may interact with other database systems. For example, employing a distributed database system, queries and data access by search ACR component may treat the combination of the ACR database, an integrated data security layer database as a single database entity (e.g., see Distributed ACR below).

In one embodiment, user programs may contain various user interface primitives, which may serve to update the ACR. Also, various accounts may require custom database tables depending upon the environments and the types of clients the ACR may need to serve. It should be noted that any unique fields may be designated as a key field throughout. In an alternative embodiment, these tables have been decentralized into their own databases and their respective database controllers (i.e., individual database controllers for each of the above tables). Employing various data processing techniques, one may further distribute the databases over several computer systemizations and/or storage devices. Similarly, configurations of the decentralized database controllers may be varied by consolidating and/or distributing the various database components 919*a-k*. The ACR may be configured to keep track of various settings, inputs, and parameters via database controllers.

The ACR database may communicate to and/or with other components in a component collection, including itself, and/or facilities of the like. Most frequently, the ACR database communicates with the ACR component, other program components, and/or the like. The database may contain, retain, and provide information regarding other nodes and data.

The ACRs

The ACR component 935 is a stored program component that is executed by a CPU. In one embodiment, the ACR component incorporates any and/or all combinations of the aspects of the ACR that was discussed in the previous figures. As such, the ACR affects accessing, obtaining and the provision of information, services, transactions, and/or the like across various communications networks. The features and embodiments of the ACR discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the ACR's features and facilities, and in many cases reduce the costs, energy consumption/requirements, and extend the life of ACR's underlying infrastructure; this has the added benefit of making the ACR more reliable. Similarly, many of the features and mechanisms are designed to be easier for users to use and access, thereby broadening the audience that may enjoy/employ and exploit the feature sets of the ACR; such ease of use also helps to increase the reliability of the ACR. In addition, the feature sets include heightened security as noted via the Cryptographic components 920, 926, 928 and throughout, making access to the features and data more reliable and secure The ACR transforms compilation request inputs, via ACR components (e.g., CP), into compilation response outputs.

The ACR component enabling access of information between nodes may be developed by employing various development tools and languages such as, but not limited to: Apache® components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the ACR server employs a cryptographic server to encrypt and decrypt communications. The ACR component may communicate to and/or with other components in a component collection, including itself, and/or facilities of the like. Most frequently, the ACR component communicates with the ACR database, operating systems, other program components, and/or the like. The ACR may contain, communicate, generate, obtain, and/or provide program component, system, user, and/or data communications, requests, and/or responses.

Distributed ACRs

The structure and/or operation of any of the ACR node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publicly accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through various data processing communication techniques.

The configuration of the ACR controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for ACR controller and/or ACR component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the ACR controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via an SSL connection, parse the data to extract variables, and store the data to a database, is provided below:

```
<?PHP
header('Content-Type: text/plain');
// set ip address and port to listen to for incoming data
$address='192.168.0.100';
$port=255;
// create a server-side SSL socket, listen for/accept incoming communication
$sock=socket_create(AF_INET, SOCK_STREAM, 0);
socket_bind($sock, $address, $port) or die('Could not bind to address');
socket_listen($sock);
$client=socket_accept($sock);
// read input data from client device in 1024 byte blocks until end of message
do {
    $input=
    $input=socket_read($client, 1024);
    $data.=$input;
} while($input !=" ");
// parse data to extract variables
$obj=json_decode($data, true);
// store input data in a database
``` mysql_connect("201.408.185.132",$DBserver,$password); // access database server
mysql_select("CLIENT_DB.SQL"); // select database to append
mysql_query("INSERT INTO UserTable (transmission) VALUES ($data)"); // add data to UserTable table in a CLIENT database
mysql_close("CLIENT_DB.SQL"); // close connection to database
?>

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

Additional embodiments may include:

1. A source code reuse compiler apparatus, comprising:
a memory;
a component collection in the memory, including:
a compilation processing component;
a processor disposed in communication with the memory, and configured to issue a plurality of processing instructions from the component collection stored in the memory,
wherein the processor issues instructions from the compilation processing component, stored in the memory, to:
obtain, via at least one processor, a compilation request datastructure, wherein the compilation request datastructure specifies an application identifier;
pull, via at least one processor, a first source code branch associated with the application identifier from a source code repository;
rebase, via at least one processor, a second source code branch associated with the application identifier using the first source code branch;
select, via at least one processor, a first transformation file in the second source code branch, wherein the first transformation file is written in a first programming language, wherein the first transformation file includes a first set of annotations that specify how to modify the first transformation file into a compilable file in the first programming language;
transform, via at least one processor, the first transformation file, in accordance with the first set of annotations, into a compilable file in the first programming language; and
generate, via at least one processor, a content package using the transformed first transformation file.

2. The apparatus of embodiment 1, wherein the first source code branch is a production source code branch.

3. The apparatus of embodiment 1, wherein the second source code branch is a demo source code branch.

4. The apparatus of embodiment 1, wherein the instructions to rebase the second source code branch further comprise instructions to merge changes from the first source code branch into the second source code branch.

5. The apparatus of embodiment 1, wherein the first programming language is one of: typescript, html, json, scss, javascript.

6. The apparatus of embodiment 1, wherein an annotation specifies a code block to add to the first transformation file.

7. The apparatus of embodiment 1, wherein an annotation specifies a code block to delete from the first transformation file.

8. The apparatus of embodiment 1, wherein an annotation specifies how to alter a code block in the first transformation file using a regular expression.

9. The apparatus of embodiment 1, wherein an annotation specifies a comment that is not copied to the transformed first transformation file.

10. The apparatus of embodiment 1, wherein an annotation specifies a comment that is copied to the transformed first transformation file.

11. The apparatus of embodiment 1, wherein the content package is configured for a platform that is one of: Android, iOS, web browser.

12. The apparatus of embodiment 1, further, comprising:
the processor issues instructions from the compilation processing component, stored in the memory, to:
select, via at least one processor, a second transformation file in the second source code branch, wherein the second transformation file is written in a second programming language, wherein the second transformation file includes a second set of annotations that specify how to modify the second transformation file into a compilable file in the second programming language;
transform, via at least one processor, the second transformation file, in accordance with the second set of annotations, into a compilable file in the second programming language; and
wherein the instructions to generate the content package further comprise instructions to generate the content package using the transformed first transformation file and the transformed second transformation file.

13. The apparatus of embodiment 1, further, comprising:
the processor issues instructions from the compilation processing component, stored in the memory, to:
replace, via at least one processor, a file in the second source code branch that originated in the first source code branch with a replacement file specific to the second source code branch and having the same file name.

14. The apparatus of embodiment 1, further, comprising:
the processor issues instructions from the compilation processing component, stored in the memory, to:
add, via at least one processor, a file that is not present in the first source code branch to the second source code branch.

15. The apparatus of embodiment 1, further, comprising:
the processor issues instructions from the compilation processing component, stored in the memory, to:
add, via at least one processor, an extra static content file to the content package post-build.

16. A processor-readable source code reuse compiler non-transient physical medium storing processor-executable components, the components, comprising:
a component collection stored in the medium, including:
a compilation processing component;
wherein the compilation processing component, stored in the medium, includes processor-issuable instructions to:

obtain, via at least one processor, a compilation request datastructure, wherein the compilation request datastructure specifies an application identifier;

pull, via at least one processor, a first source code branch associated with the application identifier from a source code repository;

rebase, via at least one processor, a second source code branch associated with the application identifier using the first source code branch;

select, via at least one processor, a first transformation file in the second source code branch, wherein the first transformation file is written in a first programming language, wherein the first transformation file includes a first set of annotations that specify how to modify the first transformation file into a compilable file in the first programming language;

transform, via at least one processor, the first transformation file, in accordance with the first set of annotations, into a compilable file in the first programming language; and generate, via at least one processor, a content package using the transformed first transformation file.

17. The medium of embodiment 16, wherein the first source code branch is a production source code branch.

18. The medium of embodiment 16, wherein the second source code branch is a demo source code branch.

19. The medium of embodiment 16, wherein the instructions to rebase the second source code branch further comprise instructions to merge changes from the first source code branch into the second source code branch.

20. The medium of embodiment 16, wherein the first programming language is one of: typescript, html, json, scss, javascript.

21. The medium of embodiment 16, wherein an annotation specifies a code block to add to the first transformation file.

22. The medium of embodiment 16, wherein an annotation specifies a code block to delete from the first transformation file.

23. The medium of embodiment 16, wherein an annotation specifies how to alter a code block in the first transformation file using a regular expression.

24. The medium of embodiment 16, wherein an annotation specifies a comment that is not copied to the transformed first transformation file.

25. The medium of embodiment 16, wherein an annotation specifies a comment that is copied to the transformed first transformation file.

26. The medium of embodiment 16, wherein the content package is configured for a platform that is one of: Android, iOS, web browser.

27. The medium of embodiment 16, further, comprising:
the compilation processing component, stored in the medium, includes processor-issuable instructions to:
select, via at least one processor, a second transformation file in the second source code branch, wherein the second transformation file is written in a second programming language, wherein the second transformation file includes a second set of annotations that specify how to modify the second transformation file into a compilable file in the second programming language;
transform, via at least one processor, the second transformation file, in accordance with the second set of annotations, into a compilable file in the second programming language; and
wherein the instructions to generate the content package further comprise instructions to generate the content package using the transformed first transformation file and the transformed second transformation file.

28. The medium of embodiment 16, further, comprising:
the compilation processing component, stored in the medium, includes processor-issuable instructions to:
replace, via at least one processor, a file in the second source code branch that originated in the first source code branch with a replacement file specific to the second source code branch and having the same file name.

29. The medium of embodiment 16, further, comprising:
the compilation processing component, stored in the medium, includes processor-issuable instructions to:
add, via at least one processor, a file that is not present in the first source code branch to the second source code branch.

30. The medium of embodiment 16, further, comprising:
the compilation processing component, stored in the medium, includes processor-issuable instructions to:
add, via at least one processor, an extra static content file to the content package post-build.

31. A processor-implemented source code reuse compiler system, comprising:
a compilation processing component means, to:
obtain, via at least one processor, a compilation request datastructure, wherein the compilation request datastructure specifies an application identifier;
pull, via at least one processor, a first source code branch associated with the application identifier from a source code repository;
rebase, via at least one processor, a second source code branch associated with the application identifier using the first source code branch;
select, via at least one processor, a first transformation file in the second source code branch, wherein the first transformation file is written in a first programming language, wherein the first transformation file includes a first set of annotations that specify how to modify the first transformation file into a compilable file in the first programming language;
transform, via at least one processor, the first transformation file, in accordance with the first set of annotations, into a compilable file in the first programming language; and
generate, via at least one processor, a content package using the transformed first transformation file.

32. The system of embodiment 31, wherein the first source code branch is a production source code branch.

33. The system of embodiment 31, wherein the second source code branch is a demo source code branch.

34. The system of embodiment 31, wherein the means to rebase the second source code branch further comprise means to merge changes from the first source code branch into the second source code branch.

35. The system of embodiment 31, wherein the first programming language is one of: typescript, html, json, scss, javascript.

36. The system of embodiment 31, wherein an annotation specifies a code block to add to the first transformation file.

37. The system of embodiment 31, wherein an annotation specifies a code block to delete from the first transformation file.

38. The system of embodiment 31, wherein an annotation specifies how to alter a code block in the first transformation file using a regular expression.
39. The system of embodiment 31, wherein an annotation specifies a comment that is not copied to the transformed first transformation file.
40. The system of embodiment 31, wherein an annotation specifies a comment that is copied to the transformed first transformation file.
41. The system of embodiment 31, wherein the content package is configured for a platform that is one of: Android, iOS, web browser.
42. The system of embodiment 31, further, comprising:
the compilation processing component means, to:
select, via at least one processor, a second transformation file in the second source code branch, wherein the second transformation file is written in a second programming language, wherein the second transformation file includes a second set of annotations that specify how to modify the second transformation file into a compilable file in the second programming language;
transform, via at least one processor, the second transformation file, in accordance with the second set of annotations, into a compilable file in the second programming language; and
wherein the instructions to generate the content package further comprise instructions to generate the content package using the transformed first transformation file and the transformed second transformation file.
43. The system of embodiment 31, further, comprising:
the compilation processing component means, to:
replace, via at least one processor, a file in the second source code branch that originated in the first source code branch with a replacement file specific to the second source code branch and having the same file name.
44. The system of embodiment 31, further, comprising:
the compilation processing component means, to:
add, via at least one processor, a file that is not present in the first source code branch to the second source code branch.
45. The system of embodiment 31, further, comprising:
the compilation processing component means, to:
add, via at least one processor, an extra static content file to the content package post-build.
46. A processor-implemented source code reuse compiler method, comprising:
executing processor-implemented compilation processing component instructions to:
obtain, via at least one processor, a compilation request datastructure, wherein the compilation request datastructure specifies an application identifier;
pull, via at least one processor, a first source code branch associated with the application identifier from a source code repository;
rebase, via at least one processor, a second source code branch associated with the application identifier using the first source code branch;
select, via at least one processor, a first transformation file in the second source code branch, wherein the first transformation file is written in a first programming language, wherein the first transformation file includes a first set of annotations that specify how to modify the first transformation file into a compilable file in the first programming language;
transform, via at least one processor, the first transformation file, in accordance with the first set of annotations, into a compilable file in the first programming language; and
generate, via at least one processor, a content package using the transformed first transformation file.
47. The method of embodiment 46, wherein the first source code branch is a production source code branch.
48. The method of embodiment 46, wherein the second source code branch is a demo source code branch.
49. The method of embodiment 46, wherein the instructions to rebase the second source code branch further comprise instructions to merge changes from the first source code branch into the second source code branch.
50. The method of embodiment 46, wherein the first programming language is one of: typescript, html, json, scss, javascript.
51. The method of embodiment 46, wherein an annotation specifies a code block to add to the first transformation file.
52. The method of embodiment 46, wherein an annotation specifies a code block to delete from the first transformation file.
53. The method of embodiment 46, wherein an annotation specifies how to alter a code block in the first transformation file using a regular expression.
54. The method of embodiment 46, wherein an annotation specifies a comment that is not copied to the transformed first transformation file.
55. The method of embodiment 46, wherein an annotation specifies a comment that is copied to the transformed first transformation file.
56. The method of embodiment 46, wherein the content package is configured for a platform that is one of: Android, iOS, web browser.
57. The method of embodiment 46, further, comprising:
executing processor-implemented compilation processing component instructions to:
select, via at least one processor, a second transformation file in the second source code branch, wherein the second transformation file is written in a second programming language, wherein the second transformation file includes a second set of annotations that specify how to modify the second transformation file into a compilable file in the second programming language;
transform, via at least one processor, the second transformation file, in accordance with the second set of annotations, into a compilable file in the second programming language; and
wherein the instructions to generate the content package further comprise instructions to generate the content package using the transformed first transformation file and the transformed second transformation file.
58. The method of embodiment 46, further, comprising:
executing processor-implemented compilation processing component instructions to:
replace, via at least one processor, a file in the second source code branch that originated in the first source code branch with a replacement file specific to the second source code branch and having the same file name.
59. The method of embodiment 46, further, comprising:
executing processor-implemented compilation processing component instructions to:

add, via at least one processor, a file that is not present in the first source code branch to the second source code branch.

60. The method of embodiment 46, further, comprising:
executing processor-implemented compilation processing component instructions to:
add, via at least one processor, an extra static content file to the content package post-build.

In order to address various issues and advance the art, the entirety of this application for Application Source Code Reuse Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivative thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a ACR individual and/or enterprise user, database configuration and/or relational model, data type, data transmission and/or network framework, syntax structure, and/or the like, various embodiments of the ACR, may be implemented that allow a great deal of flexibility and customization. For example, aspects of the ACR may be adapted for temporary application versions. While various embodiments and discussions of the ACR have included compilers, however, it is to be understood that the embodiments described herein may be readily configured and/or customized for a wide variety of other applications and/or implementations.

What is claimed is:

1. A source code reuse compiler apparatus, comprising:
a memory;
a component collection in the memory, including:
a compilation processing component;
a processor disposed in communication with the memory, and configured to issue a plurality of processing instructions from the component collection stored in the memory,
wherein the processor issues instructions from the compilation processing component, stored in the memory, to:
obtain, via at least one processor, a compilation request datastructure, wherein the compilation request datastructure specifies an application identifier;
pull, via at least one processor, a first source code branch associated with the application identifier from a source code repository;
rebase, via at least one processor, a second source code branch associated with the application identifier using the first source code branch;
select, via at least one processor, a first transformation file in the second source code branch, wherein the first transformation file is written in a first programming language, wherein the first transformation file includes a first set of annotations that specify how to modify the first transformation file into a compilable file in the first programming language;
transform, via at least one processor, the first transformation file, in accordance with the first set of annotations, into a compilable file in the first programming language; and generate, via at least one processor, a content package using the transformed first transformation file.

2. The apparatus of claim 1, wherein the first source code branch is a production source code branch.

3. The apparatus of claim 1, wherein the second source code branch is a demo source code branch.

4. The apparatus of claim 1, wherein the instructions to rebase the second source code branch further comprise instructions to merge changes from the first source code branch into the second source code branch.

5. The apparatus of claim 1, wherein the first programming language is one of: typescript, html, json, scss, javascript.

6. The apparatus of claim 1, wherein an annotation specifies a code block to add to the first transformation file.

7. The apparatus of claim 1, wherein an annotation specifies a code block to delete from the first transformation file.

8. The apparatus of claim 1, wherein an annotation specifies how to alter a code block in the first transformation file using a regular expression.

9. The apparatus of claim 1, wherein an annotation specifies a comment that is not copied to the transformed first transformation file.

10. The apparatus of claim 1, wherein an annotation specifies a comment that is copied to the transformed first transformation file.

11. The apparatus of claim 1, wherein the content package is configured for a platform that is one of: Android, iOS, web browser.

12. The apparatus of claim 1, further, comprising:
the processor issues instructions from the compilation processing component, stored in the memory, to:
select, via at least one processor, a second transformation file in the second source code branch, wherein the second transformation file is written in a second programming language, wherein the second transformation file includes a second set of annotations that specify how to modify the second transformation file into a compilable file in the second programming language;
transform, via at least one processor, the second transformation file, in accordance with the second set of annotations, into a compilable file in the second programming language; and
wherein the instructions to generate the content package further comprise instructions to generate the content package using the transformed first transformation file and the transformed second transformation file.

13. The apparatus of claim 1, further, comprising:
the processor issues instructions from the compilation processing component, stored in the memory, to:
replace, via at least one processor, a file in the second source code branch that originated in the first source code branch with a replacement file specific to the second source code branch and having the same file name.

14. The apparatus of claim 1, further, comprising:
the processor issues instructions from the compilation processing component, stored in the memory, to:
add, via at least one processor, a file that is not present in the first source code branch to the second source code branch.

15. The apparatus of claim 1, further, comprising:
the processor issues instructions from the compilation processing component, stored in the memory, to:
add, via at least one processor, an extra static content file to the content package post-build.

16. A processor-readable source code reuse compiler non-transient physical medium storing processor-executable components, the components, comprising:
a component collection stored in the medium, including:
a compilation processing component;
wherein the compilation processing component, stored in the medium, includes processor-issuable instructions to:
obtain, via at least one processor, a compilation request datastructure, wherein the compilation request datastructure specifies an application identifier;
pull, via at least one processor, a first source code branch associated with the application identifier from a source code repository;
rebase, via at least one processor, a second source code branch associated with the application identifier using the first source code branch;
select, via at least one processor, a first transformation file in the second source code branch, wherein the first transformation file is written in a first programming language, wherein the first transformation file includes a first set of annotations that specify how to modify the first transformation file into a compilable file in the first programming language;
transform, via at least one processor, the first transformation file, in accordance with the first set of annotations, into a compilable file in the first programming language; and
generate, via at least one processor, a content package using the transformed first transformation file.

17. A processor-implemented source code reuse compiler system, comprising:
a compilation processing component means, to:
obtain, via at least one processor, a compilation request datastructure, wherein the compilation request datastructure specifies an application identifier;
pull, via at least one processor, a first source code branch associated with the application identifier from a source code repository;
rebase, via at least one processor, a second source code branch associated with the application identifier using the first source code branch;
select, via at least one processor, a first transformation file in the second source code branch, wherein the first transformation file is written in a first programming language, wherein the first transformation file includes a first set of annotations that specify how to modify the first transformation file into a compilable file in the first programming language;
transform, via at least one processor, the first transformation file, in accordance with the first set of annotations, into a compilable file in the first programming language; and
generate, via at least one processor, a content package using the transformed first transformation file.

18. A processor-implemented source code reuse compiler method, comprising:
executing processor-implemented compilation processing component instructions to:

obtain, via at least one processor, a compilation request datastructure, wherein the compilation request datastructure specifies an application identifier;
pull, via at least one processor, a first source code branch associated with the application identifier from a source code repository;
rebase, via at least one processor, a second source code branch associated with the application identifier using the first source code branch;
select, via at least one processor, a first transformation file in the second source code branch, wherein the first transformation file is written in a first programming language, wherein the first transformation file includes a first set of annotations that specify how to modify the first transformation file into a compilable file in the first programming language;
transform, via at least one processor, the first transformation file, in accordance with the first set of annotations, into a compilable file in the first programming language; and
generate, via at least one processor, a content package using the transformed first transformation file.

\* \* \* \* \*